United States Patent [19]

Buechler

[11] Patent Number: 5,372,504
[45] Date of Patent: Dec. 13, 1994

[54] APPARATUS FOR PILOT TRAINING

[76] Inventor: Richard L. Buechler, 11 Hovey, Oxford, Mich. 48371

[21] Appl. No.: 735,998

[22] Filed: Jul. 25, 1991

[51] Int. Cl.⁵ .................................................. G09B 9/36
[52] U.S. Cl. ............................................ 434/35; 2/13; 351/47; 434/36
[58] Field of Search ................... 434/35, 36, 433, 184; 351/47, 57; 273/190 R, 190 A; 2/13

[56] References Cited

U.S. PATENT DOCUMENTS

| | | |
|---|---|---|
| 2,510,848 | 6/1950 | Wood . |
| 2,572,656 | 10/1951 | Ohtenburger . |
| 2,607,918 | 8/1952 | Gruber ............................... 2/13 |
| 2,687,671 | 8/1954 | Mosher ............................ 2/13 X |
| 2,694,263 | 11/1954 | Francis et al. . |
| 3,228,696 | 1/1966 | Hull ............................. 273/190 A |
| 3,356,439 | 12/1967 | Magnus . |
| 3,453,042 | 7/1969 | Cooper . |
| 3,499,112 | 3/1970 | Heilmeier et al. . |
| 3,575,497 | 4/1971 | LeBlanc ............................... 351/47 |
| 3,629,870 | 12/1971 | Paisley ........................... 434/36 X |
| 3,876,295 | 4/1975 | Loughner . |
| 3,901,589 | 8/1975 | Bienenfeld ......................... 2/13 X |
| 4,022,475 | 5/1977 | Todd .............................. 2/13 X |
| 4,106,217 | 8/1978 | Witt . |
| 4,119,369 | 10/1978 | Eloranta et al. . |
| 4,187,006 | 2/1980 | Neidell .............................. 2/13 X |
| 4,196,981 | 4/1980 | Waldrop ........................... 2/13 X |
| 4,298,249 | 11/1981 | Gloor et al. . |
| 4,511,226 | 4/1985 | Freeman . |
| 4,659,196 | 4/1987 | Gazeley . |
| 4,698,022 | 10/1987 | Gilson . |
| 4,953,231 | 9/1990 | Burnett ............................... 2/13 |
| 4,955,707 | 9/1990 | Gazeley . |
| 5,100,224 | 3/1992 | Terrasi ............................ 434/35 X |

FOREIGN PATENT DOCUMENTS 0674929  8/1990  Switzerland ..................... 128/24 R Primary Examiner—Richard J. Apley
Assistant Examiner—Karen A. Jalbert
Attorney, Agent, or Firm—Harness, Dickey & Pierce

[57] ABSTRACT

A pilot training apparatus for selectively occluding pilot vision along a forward line of sight. The apparatus including a lens having a vision occluded region and a vision permissive region. The lens is coupled to a detent means which allows the lens to be moved from a training position where the lens is positioned in the forward line of sight of the pilot and an non-training position where the lens is positioned out of the forward line of sight of the pilot. When in the training position, the lens occludes the vision of the pilot exterior of the aircraft cockpit, while permitting the vision interior of the aircraft cockpit toward the instrument panel.

26 Claims, 2 Drawing Sheets

APPARATUS FOR PILOT TRAINING

BACKGROUND OF THE INVENTION

1. Field of the Invention

The present invention is related to pilot training devices for selectively occluding the forward vision of a pilot. More particularly, the invention is an instrument flight rules training aid which may be readily moved from a non-training position, where the pilot's vision is unobstructed, to a training position where the forward vision of the pilot is selectively occluded, permitting vision of only the instrument panel in the aircraft cockpit.

2. Description of the Related Art

Training procedures which have evolved in connection with the instruction of pilots provide for a variety of defined aircraft procedures and maneuvers. Federal Aviation Administration (FAA) regulations require that in order to obtain and maintain instrument certification, each of these airborne maneuvers must be carried out under both visual flight rules (VFR) and instrument flight rules (IFR). In achieving IFR certification, instrument only flight time is generally logged under airborne flight conditions which simulate the limited visibility situations that require reliance upon instrumentation and which would exclude any visual references outside of the aircraft.

To simulate airborne conditions where exterior visual references are obstructed from the pilot's vision, various IFR training aids have been utilized. One IFR training aid utilizes a blue-yellow chromatic screening technique. With this aid, a blue transparent polymeric material is applied against the windscreen of the aircraft, while the pilot wears yellow or amber tinted glasses. As a consequence of the interaction between the blue and yellow tints, the vision of the pilot is blocked with respect to the exterior of the aircraft cockpit. Vision within the cockpit is tinted, but permitted. This technique, however, has fallen from use since the instructor's or safety pilot's vision, exterior of the cockpit, is also limited by the tinting.

A more current and widely used IFR training technique involves the use of a plastic hood. The hood is positioned on the head of the pilot and is shaded to form a vision directing blinder. The blinder extends a distance from the face of the pilot to an extent where all peripheral and forward vision, other than forward vision of the instrument panel, is obstructed.

While some versions of the blinder have a shorter forward extension, all embodiments present a hazard in that the vision of the instructor, to the pilot's side of the aircraft, is blocked or obstructed. A further disadvantage of an IFR hood is its claustrophobic effect on the pilot. The hood's restrained vision, and the noticeable lack of peripheral light, provides the pilot with a training condition that is not as close to actual limited visibility flight conditions as is preferred. Additionally, the hood type IFR training aids are bulky and limit the type of radio headset which can be worn.

Finally, the use of such hoods also limit the speed with which the pilot can respond to potential emergency situations during IFR training. For example, if the pilot receives a message from an air traffic controller of a potential hazard (for example, a plane in close proximity at an unknown altitude doing numerous maneuvers), the pilot must assume the worst case scenario and prepare to protect himself and his passengers from a potentially imminent collision. This, however, is difficult to do when the hood must be first removed before any evasive action can be undertaken.

An IFR training aid which permits peripheral light is the vision obstructing training glasses such as that which is disclosed in U.S. Pat. No. 4,698,022 to Gilson. As shown in U.S. Pat. No. 4,698,022, these IFR training glasses have an opaque frosting on their lenses to restrict vision to only the instrument panel of the aircraft cockpit. Such vision obstructing training glasses, however, often interfere with the use of prescription glasses or the use of a favorite pair of sunglasses. In addition, such vision obstructing training glasses also often interfere with the use of certain types of radio headsets.

A further limitation of the previous designs is that the pilot is not provided with the opportunity to become familiar or comfortable with the quick, real world transition from VFR flying to IFR flying. Such IFR training aid must be put on by the pilot to initiate an IFR simulation and manually removed to return to VFR flying.

SUMMARY OF THE INVENTION

With the above limitations in mind, it is an object of the present invention to provide an IFR training aid which closely simulates real world flying conditions.

Another object of the present invention is to provide an IFR training aid which may be easily used with a variety of eyewear, including prescription eyeglasses and sunglasses.

An additional object of the present invention is to provide for the quick transition from VFR flying to IFR flying.

Another object of the invention is to provide an IFR training aid which is lightweight and unobtrusive.

In view of the above objects, the present invention provides for an IFR pilot training apparatus which is easily used in conjunction with a pair of eyeglasses or sunglasses. The IFR pilot training apparatus of the present invention includes a pair of lenses, an attachment structure and a detent structure. The attachment structure enables the pilot training apparatus to "clip-on" to numerous styles of eyewear. Accordingly, the pilot training apparatus does not generally interfere with the use of eyeglasses or sunglasses, nor does it substantially interfere with muff-type radio headsets.

The detent structure allows the lenses to be moved between a training position and a non-training position. When in the training position, the lenses extend downward in front of the pilot's eyes substantially adjacent to the lenses of the pilot's eyewear. The lenses have an occluded region, which inhibits a forward line of vision exterior of the aircraft cockpit, and a vision permitting region which permits vision along a forward line of sight toward the instrument panel of the aircraft. When in the non-training position, the apparatus is "flipped-up" and out of the forward line of sight of the pilot.

During pilot training, the apparatus of the present invention may be readily moved from its non-training position to its training position, by either the instructor or the pilot, to simulate the abrupt transition from VFR to IFR flying. In this fashion, the pilot will become comfortable with the quick transitions associated with real world IFR flying and will become more tolerant of motion illusions.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE PREFERRED EMBODIMENTS

An important aspect in the training of an aircraft pilot is the ease with which the pilot converts from visual flight rules (VFR) flying to IFR flying. Since flying conditions can almost instantaneously deteriorate, the ease with which the pilot makes the transition from VFR to IFR is significant in improving pilot confidence. Such transitions may occur when flying into or breaking out of cloud cover, or when visibility affecting factors (such as fog, haze, smoke, etc.) are present. Previous IFR training aids have failed to conveniently make the transition from VFR to simulated IFR flying. With the present invention, an instructor may conveniently switch between VFR and IFR without providing a pilot with significant advance notice of the upcoming transition, thereby increasing the pilot's comfort level concerning transitions into and out of IFR flying. In addition, the pilot training apparatus of the present invention does not generally interfere with the pilot's use of prescription eyeglasses or sunglasses nor does it substantially interfere with muff-type radio headsets.

Figure 1:
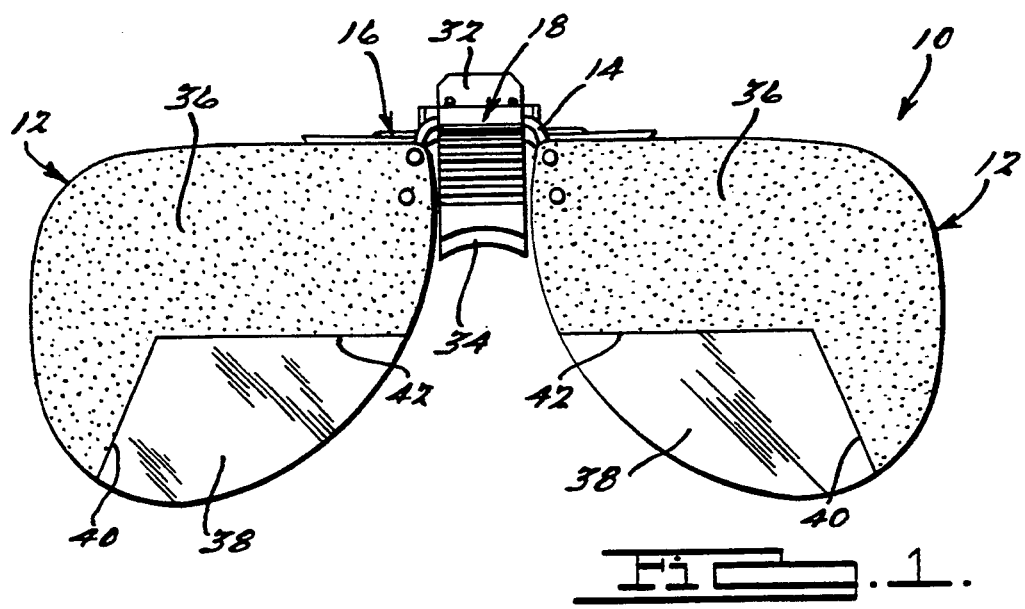
FIG. 1 is a front elevational view of a pilot training apparatus according to the teachings of the first preferred embodiment of the present invention.
Figure 2:
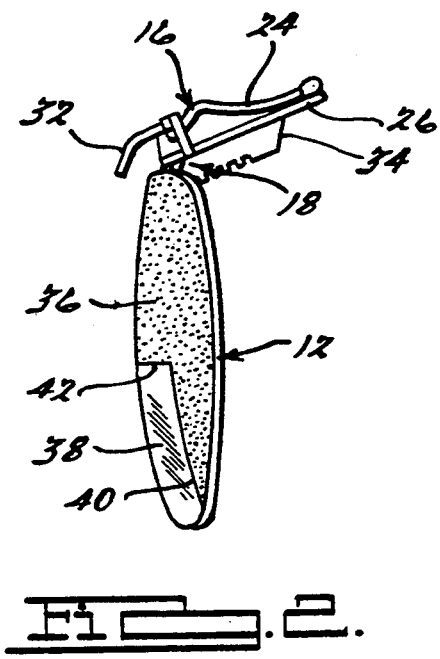
FIG. 2 is a side elevational view of the first preferred embodiment of the present invention as shown in FIG. 1.

Now with reference to the drawing, a pilot training apparatus embodying the principles of the present invention is illustrated in FIG. 1 and generally designated by the numeral 10. The pilot training apparatus 10 is a visual occlusion device for instrument flight rules (IFR) training. The pilot training apparatus 10 generally includes left and right lenses 12 being connected by a supporting frame 14. Incorporated into the frame 14 are both a mounting mechanism 16 and a detent mechanism 18.

The mounting mechanism 16 is of a type which enables the pilot training apparatus 10 to "clip-on" to the eyewear 20 being worn by a pilot 22. As such, the pilot training apparatus 10 of the present invention may be used in conjunction with a pilot's prescription eyeglasses or sunglasses. The mounting mechanism 16 generally includes two pair of cooperating legs, inner legs 24 and outer legs 26. The legs 24 and 26 are biased toward one another and permit either the frame 28 or the lenses 30 of the eyewear 20 to be inserted therebetween. Once the eyewear 20 has been inserted, the pilot-training apparatus 10 is retentively and securely held to the eyewear 20 through the frictional gripping force exerted by the inner legs 24 and the outer legs 26.

To assist in mounting and removing the pilot training apparatus 10, the mounting mechanism 16 may be provided with a manually operable release which includes a finger release 32 and a thumb grip 34. By respectively positioning the forefinger and thumb on the finger release 32 and thumb grip 34 and exerting pressure therebetween, a force may be supplied to the mounting mechanism 16 sufficient to bias the inner legs 24 and the outer legs 26 apart, enabling readily removal or mounting of the pilot training apparatus 10 with the eyewear 20 of the pilot 22.

Figure 3:
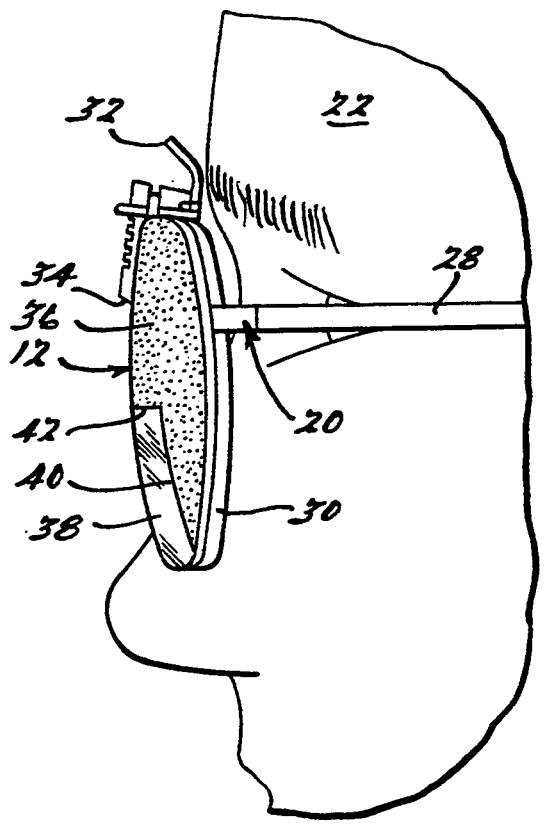
FIG. 3 is a side view of the pilot training apparatus according to the first preferred embodiment of the present invention as shown in FIG. 1 in its training position and mounted to the eyewear of a pilot.
Figure 4:
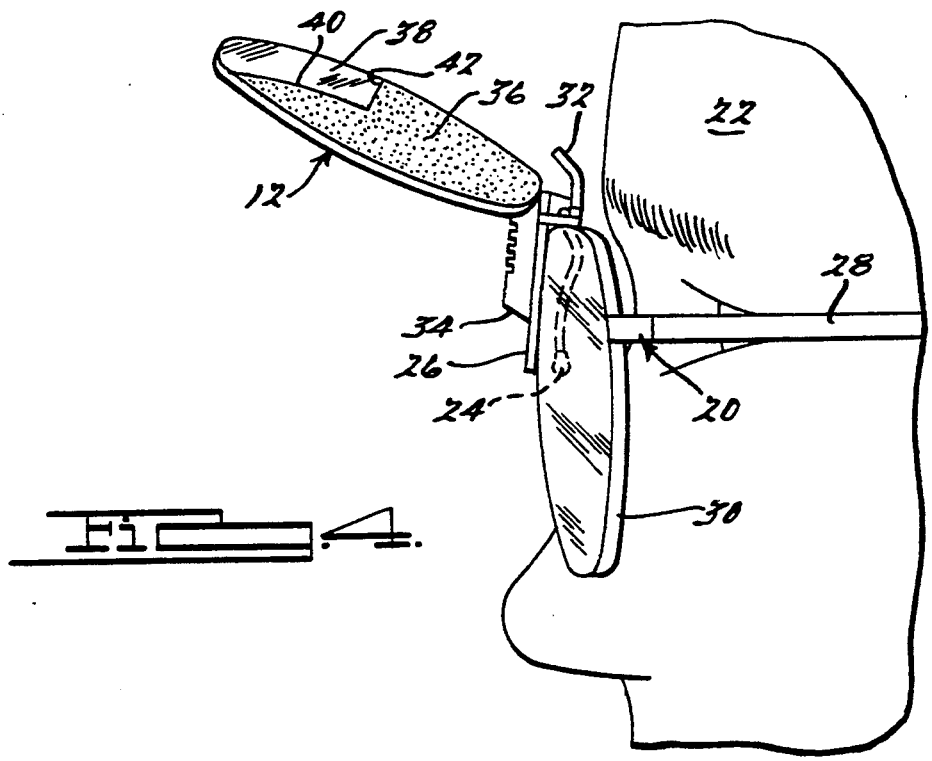
FIG. 4 is a side elevational view of the pilot training apparatus according to the first preferred embodiment of the present invention as shown in FIG. 1 illustrating the pilot training apparatus of the present invention being mounted to the eyewear of a pilot and being positioned in its non-training position.

The detent mechanism 18 of the present invention enables the lenses 12 to be selectively moved between a training position, generally shown in FIG. 3, and a non-training position, shown in FIG. 4. In either position, the detent mechanism 18 securely maintains the position of the lenses 12 relative to the eyewear 20.

Each of the lenses 12 include a vision occluded region 36 and a vision permissive region 38. The vision occluded region 36 is a opaque region which covers a majority of the surface of the lenses 12. While the vision occluded region 36 could have a number of shapes, it is generally preferable that the vision occluded region 36 occupy the upper portions of the lenses 12 and include portions extending downwardly and outwardly along the outboard or lateral sides of the lenses 12.

With the vision occluded region 36 extending as described, the vision permissive region 38 will be provided in the lower medial portion of the lenses 12 and will also exhibit a downwardly and outwardly directed lateral portion. In the figures, the lateral boundary between the vision occluded region 36 and the vision permissive region 34 is generally designated at boundary edge 40, while the vertical boundary is generally designated by boundary edge 42.

With the pilot training apparatus 10 in its training position, the lenses 12 will generally correspond to the lenses 30 of the eyewear 20 of the pilot 22 and the vision occluded region 36 will effectively occlude a forward line of sight directed toward the airspace exterior of the aircraft cockpit. In an analogous fashion, the vision permissive region 38 will permit pilot vision along a forward line of sight interior of the aircraft cockpit, generally toward the instrument panel.

During pilot training, flying will be initiated with the pilot training apparatus 10 in its non-training or "flipped-up" position. At some point during the course of the training session, the instructor will cause the training apparatus 10 to be moved from its non-training position to its training or "flipped-down" position, thus simulating the abrupt entrance of the aircraft into a poor visibility and IFR situation. Conversely, the instructor may flip the training apparatus 10 from its training position to its non-training position to simulate the aircraft breaking from cloud cover. In this manner, real world flying conditions can more accurately be simulated allowing the pilot 22 to become more accustomed with an unexpected and/or abrupt transition from VFR to IFR flying. Since the pilot training apparatus 10 does not block peripheral light, the pilot 22 is not subjected to the claustrophobic training condition previously mentioned and real world flying is more accurately simulated.

Figure 5:
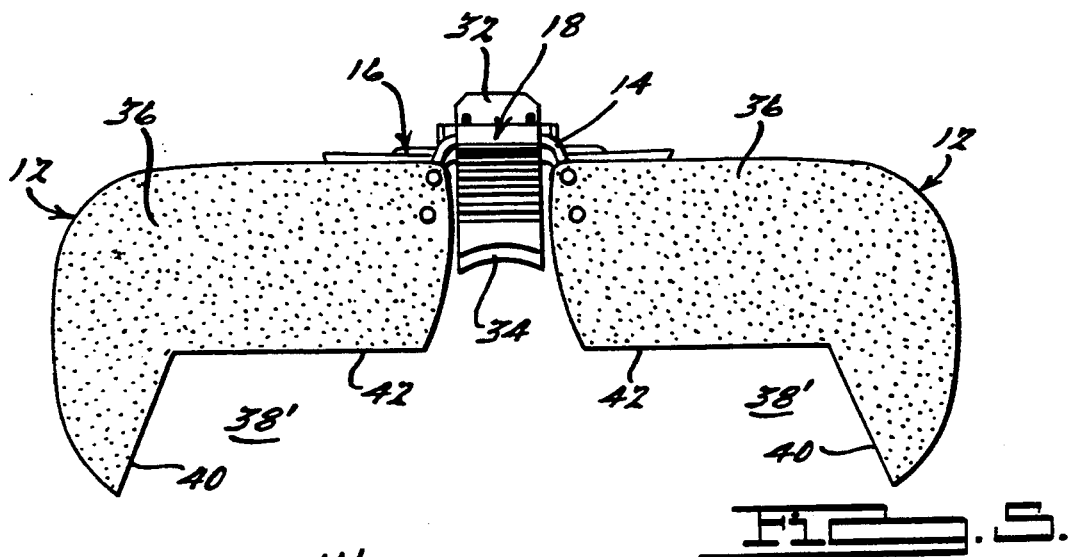
FIG. 5 is a front elevational view of the pilot training apparatus according to the teachings of the second embodiment of the present invention.

A second embodiment of the present invention is illustrated in FIG. 5. Since the second embodiment includes features common to those of the embodiment discussed above, like elements are designated with like references. The second embodiment differs from that of FIGS. 1-4 in that the vision permissive region 38 of the second embodiment is not integrally formed with the vision occluded region 36. In this second embodiment, the vision permissive region, designated at 38', is a section cut-out from the lenses 12. By forming the vision permissive region 38 as a cutout section, the weight of the pilot training apparatus 10 may be reduced. The second embodiment may typically be used when the pilot 22 is using prescription eyeglasses or sunglasses.

Figure 6:
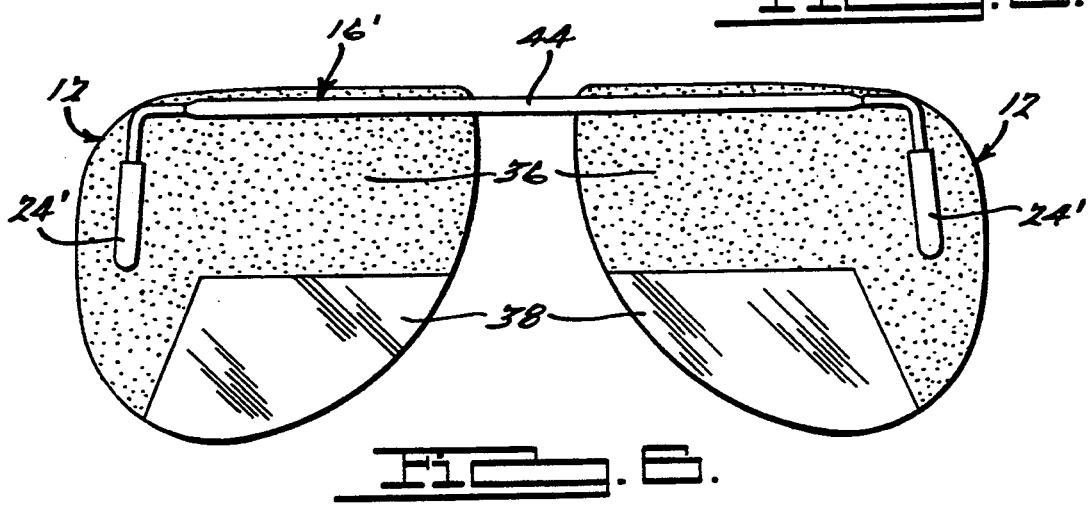
FIG. 6 is a rear elevational view of the pilot training apparatus according to the teachings of the third embodiment of the present invention.

A third embodiment of the pilot training apparatus 10 is illustrated in FIG. 6. Again, common elements are designated with like references. In the third embodiment, the mounting mechanism 16' includes no outer legs and one pair of inner legs 24'. A torsionally biased center bar 44 secures the mounting mechanism 16' to the lenses 12 and extends across the bridge of the lenses 12, providing increased rigidity to the pilot training apparatus. In this embodiment the inner legs 24' will cooperate with the inner surfaces of the lenses 12 themselves to "clip" the pilot training apparatus 10 to the eyewear 20 of the pilot 22. The torsion bar 44 is of a type known in the industry and as such, may include a spring member (not shown) for biasing the inner legs 24' toward the lenses 12.

The lenses of the present invention may be constructed from either glass or plastic. Glass provides scratch resistance, while plastic offers the convenience of light weight. Additionally, the lenses may be clear, tinted, photochromatic, or high contrast. It is preferable however, that the vision occluded region 36 retains transparency while the vision permissive region 38 remains transparent.

Various methods can be used in forming the vision occluded region 36 including surface treatment of that portion of the lens. The preferred surface treatment method is sandblasting. However, surface etching and other methods of forming an opaque surface can be employed.

Finally, the mounting and detent mechanism of the first and second embodiments may be that which is available from Foster Grant Co. However, other suitable mounting and detent mechanisms may be used.

While the above description constitutes the preferred embodiments of the present invention, it will be appreciated that the invention is susceptible to modification, variation and change without departing from the proper scope and fair meaning of the accompanying claims.

What is claimed is:

1. A pilot training apparatus for selectively occluding the vision of said pilot along a forward line of sight exterior of an aircraft cockpit when said pilot is positioned therein, said apparatus comprising:

a lens having a vision occluded region and portions defining a vision permissive region adjacent thereto, said vision occluded region having a first portion being positioned above said vision permissive region and including a generally horizontal lower edge defining an upper portion of said vision permissive region, said vision occluded region also having a second portion being positioned lateral of said vision permissive region and having an inner edge being outwardly angled and defining a lateral portion of said vision permissive region, said vision occluded region being effective for occluding substantially all vision of said aircraft cockpit, said vision permissive region being effective for substantially permitting vision of said pilot along a forward line of sight interior of said aircraft cockpit and said lens having a contour enabling entrance of non-occluded natural peripheral light for enhancing training conditions and enables non-occluded peripheral vision by the pilot; and detent means being mounted to said lens for selectively moving said lens between first and second positions and for keeping said lens in one of said positions, with said lens in said first position said vision occluded region being positioned to occlude substantially all vision of said pilot along a forward line of sight exterior of said aircraft cockpit and said vision permissive region being positioned to permit non-occluded pilot vision along a forward line of sight interior of said aircraft cockpit, with said lens in said second position said vision occluded region being positioned out of said forward line of sight of said pilot thereby allowing for pilot vision exterior of said aircraft cockpit.

2. An apparatus as set forth in claim 1, wherein said vision occluded region is formed in an upper portion of said lens.

3. An apparatus as set forth in claim 1, wherein said vision permissive region is formed in a lower portion of said lens.

4. An apparatus as set forth in claim 1, wherein said vision occluded region is integrally formed with said vision permissive region.

5. An apparatus as set forth in claim 4, wherein said vision permissive region is transparent.

6. An apparatus as set forth in claim 1, wherein said vision occluded region is a surface treated region having been treated to produce non-transparency.

7. An apparatus as set forth in claim 1, wherein said vision permissive region is defined by edges of said lens and is a cut away portion of said lens.

8. An apparatus as set forth in claim 7, wherein said cut away portion is defined by edges of said vision occluded region.

9. An apparatus as set forth in claim 1, wherein said apparatus further comprises means for mounting said apparatus to eyewear.

10. An apparatus as set forth in claim 9, wherein said mounting means mounts to a supportive frame of said eyewear.

11. An apparatus as set forth in claim 9, wherein said mounting means mounts lenses of said eyewear.

12. An apparatus as set forth in claim 9, wherein said mounting means includes first and second sets of legs, said legs being biased together for receiving said eyewear therebetween to securely mount said apparatus thereon.

13. An apparatus as set forth in claim 9, wherein said vision occluded region is formed in an upper portion of said lens.

14. An apparatus as set forth in claim 13, wherein said vision permissive region is formed in a lower portion of said lens.

15. An apparatus as set forth in claim 9, wherein said vision permissive region is transparent.

16. An apparatus as set forth in claim 9, wherein said vision occluded region is a surface treated region having been treated to produce non-transparency.

17. An apparatus as set forth in claim 9, wherein said vision permissive region is defined by edges of said lens and is a cut away portion of said lens.

18. An apparatus as set forth in claim 17, wherein said cut away portion is defined by edges of said vision occluded region.

19. An eyewear mounted pilot training apparatus for selectively occluding vision of said pilot along a forward line of sight when said pilot is positioned within an aircraft cockpit, said apparatus comprising:

a lens having a vision occluded region and portions defining a vision permissive region adjacent thereto, said vision occluded region having a first portion being positioned above said vision permissive region and including a generally horizontal lower edge defining an upper portion of said vision permissive region, said vision occluded region also having a second portion being positioned lateral of said vision permissive region and having an inner edge being outwardly angled and defining a lateral portion of said vision permissive region, said vision occluded region being effective for occluding substantially all vision of said aircraft cockpit, said vision permissive region being effective for substantially permitting vision of said pilot along a forward line of sight interior of said aircraft cockpit and said lens having a contour enabling entrance of non-occluded natural peripheral light for enhancing training conditions and enables non-occluded peripheral vision by the pilot; and means for removably mounting said lens to said eyewear, said mounting being coupled to said lens and including a pair of legs being engageable with said eyewear.

20. A pilot training apparatus as set forth in claim 19, wherein said vision permissive region is integrally formed with said vision occluded region.

21. A pilot training apparatus as set forth in claim 20, wherein said vision permissive region is transparent.

22. A pilot training apparatus as set forth in claim 19, wherein said vision occluded region is a surface treated region having been treated to produce non-transparency.

23. A pilot training apparatus as set forth in claim 19, wherein said vision occluded region is a sandblasted region.

24. A pilot training apparatus as set forth in claim 19, wherein said vision occluded region is non-transparent.

25. A pilot training apparatus as set forth in claim 19, wherein said vision permissive region is defined by edges of said lens and is a cut away portion of said lens.

26. A pilot training apparatus as set forth in claim 19, further comprising detent means for movably positioning said lens in first and second positions, in said first position said vision occluded region effectively occluding vision along a forward line of sight exterior of said aircraft cockpit.

* * * * *